(12) United States Patent
Groom et al.

(10) Patent No.: US 8,883,009 B2
(45) Date of Patent: Nov. 11, 2014

(54) WATER TREATMENT

(75) Inventors: Elaine Groom, Belfast (GB); Simon Murray, Belfast (GB); Joel Ferguson, Belfast (GB)

(73) Assignee: The Queen's University of Belfast, Belfast (GB)

( * ) Notice: Subject to any disclaimer, the term of this patent is extended or adjusted under 35 U.S.C. 154(b) by 659 days.

(21) Appl. No.: 12/744,388

(22) PCT Filed: Dec. 19, 2008

(86) PCT No.: PCT/GB2008/004193
§ 371 (c)(1),
(2), (4) Date: Jul. 14, 2010

(87) PCT Pub. No.: WO2009/081118
PCT Pub. Date: Jul. 2, 2009

(65) Prior Publication Data
US 2011/0000850 A1 Jan. 6, 2011

(30) Foreign Application Priority Data
Dec. 20, 2007 (GB) .................................. 0724813.1

(51) Int. Cl.
| C02F 3/00 | (2006.01) |
| B01F 3/04 | (2006.01) |
| B01D 21/00 | (2006.01) |
| C02F 3/20 | (2006.01) |
| B01D 21/24 | (2006.01) |
| C02F 101/16 | (2006.01) |
| C02F 1/00 | (2006.01) |

(52) U.S. Cl.
CPC ........ B01F 3/04269 (2013.01); B01D 21/0057 (2013.01); C02F 2101/16 (2013.01); B01F 2003/04404 (2013.01); C02F 2209/08 (2013.01); C02F 3/208 (2013.01); B01D 21/0045 (2013.01); C02F 2001/007 (2013.01); C02F 2301/022 (2013.01); B01D 21/2427 (2013.01)

USPC ............................ 210/620; 210/622; 210/521

(58) Field of Classification Search
USPC ................................... 210/620, 220, 521–522
See application file for complete search history.

(56) References Cited

U.S. PATENT DOCUMENTS 3,482,694 A * 12/1969 Rice .............................. 210/615
3,966,608 A    6/1976 Mason
(Continued)

FOREIGN PATENT DOCUMENTS

| CN | 101024539 B1 | 8/2007 |
| DE | 3544382 B1 | 12/1985 |

(Continued)

OTHER PUBLICATIONS

Metso Minerals, Inclined Plate Settlers (Brochure No. 1223-02-06-MP), 2006, Web Publication http://www.metso.com/miningandconstruction/MaTobox7.nsf/DocsByID/909127C821746DDE41256B41004D7B71/$File/Inclined_Plate_Settler.pdf.

(Continued)

*Primary Examiner* — Chester Barry
(74) *Attorney, Agent, or Firm* — Winstead PC

(57) ABSTRACT

A process for the treatment of water comprising at least the steps of: (a) providing the water in laminar flow; and (b) providing bubblefree aeration to the water. The present invention introduces aerobic treatment into wastewater settlement without any hindrance to the settlement process. The present invention is useable for any settlement step or stage, without limitation, the commonest being primary settlement or final settling.

16 Claims, 3 Drawing Sheets

(56) References Cited

U.S. PATENT DOCUMENTS

| | | | |
|---|---|---|---|
| 4,181,604 A | | 1/1980 | Numazawa |
| 4,929,349 A | | 5/1990 | Beckman |
| 5,011,605 A | | 4/1991 | Pape |
| 5,342,781 A | * | 8/1994 | Su ............................ 435/296.1 |
| 5,575,909 A | | 11/1996 | Foster |
| 6,132,602 A | * | 10/2000 | Luehr ............................ 210/150 |
| 2004/0079692 A1 | * | 4/2004 | Cote et al. .................... 210/220 |
| 2006/0163157 A1 | | 7/2006 | Cote |
| 2008/0017558 A1 | * | 1/2008 | Pollock et al. ................ 210/90 |

FOREIGN PATENT DOCUMENTS

| | | |
|---|---|---|
| DE | WO03/099731 B2 | 12/2003 |
| DE | EP1854524 B2 | 11/2007 |
| EP | 0557922 B2 | 9/1993 |
| GB | 2239237 B1 | 6/1991 |
| GB | 2253622 B1 | 9/1992 |
| GB | WO92/21435 B1 | 12/1992 |
| GB | 2275921 B1 | 9/1994 |
| GB | 2317168 B1 | 3/1998 |
| JP | 2002085907 B1 | 3/2002 |

OTHER PUBLICATIONS

Locker, Locker Clarifier Systems, accessed Feb. 21, 2008, website http://www.clarifiersystems.co.uk/clarifier_cleaning/.

* cited by examiner

WATER TREATMENT

This invention relates to a water treatment system, apparatus and process.

Wastewaters generated by urban populations and industrial developments must be treated to remove damaging pollutants before they are discharged to surface waters. There are a number of treatments that are used to remove these contaminants before discharge; these are based on chemical, physical and biological processes. Most of these treatments employ up-flow or cross-flow settlement for the final separation of clarified wastewater from the sludges formed in earlier treatments. However, the effluent discharged from these wastewater treatment facilities must meet increasingly stringent environmental discharge standards. This, combined with increasing wastewater production, can mean that previously adequate treatment systems may well become inadequate, requiring upgrading or replacement in order to remain consent compliant.

Replacing existing systems with new ones renders the existing systems obsolete. Adding polishing steps will involve new tanks, civil works and process equipment. Both of these involve significant investment in capital equipment. The increased footprint demand can also be expensive and in some cases the additional space may not be available.

Existing technologies allow for the volumetric capacity of settlement basins to be increased by the placement of inclined lamella plates within the settler, increasing the overflow rates by between 2 and 8 times that for a conventional settler. Wastewaters may still however exceed the discharge consent for specific parameters such as BOD (Biochemical Oxygen Demanding) material, ammonia and total nitrogen. Aerobic wastewater treatment processes best remove these pollutants. However, in many cases, there is no spare capacity in existing chemical or biological treatment systems to accommodate additional treatment.

Although conventional final stage settlement has a long hydraulic retention time, aerobic bio-treatment during settlement is extremely limited due to the very low levels of dissolved oxygen present in the wastewater. Improvement in the performance of existing wastewater treatment systems beyond efficiency increases though operational management therefore normally requires the addition to or replacement of existing processes to deliver the additional aerobic biological treatment necessary.

When a treatment system is under performing and failing to remove the required levels of biodegradable BOD material, there are a number of options for the upgrade of the treatment works. These technologies also apply to new and replacement treatment works.

These systems are broadly based on two technologies. Firstly, an activated sludge process. In this system oxygen is supplied to the wastewater by blowing air into a large vessel that contains the wastewater. The oxygen encourages the natural microbes in the wastewater to grow and in doing so they multiply and consume the biologically degradable organic matter, converting it into biomass that is particulate in form and therefore settable from the main solution. The soluble biodegradable matter (BOD) is thereby converted into settable biomass. These processes are normally operated continuously with the biomass being settled in secondary vessels known as settlement or clarifier tanks. The settled biomass or sludge would then be drawn off and pumped to a third tank where it is stored until it is dewatered before being discharged to a skip for disposal. A proportion of the sludge is transferred back to the main aeration basin in order to maintain a high microorganism to food (BOD) ratio, thereby ensuring a good level of treatment.

In total for this technology a minimum of three tanks are required. This has a large space requirement and is costly. Upgrading existing systems requires the addition of new vessels to provide additional aerobic biological treatment capacity. This technology cannot be applied to existing settling tanks, as the process of aeration would create turbulence that would hinder settling.

The second system involves fixed film processes. In these relatively high rate processes the wastewater is similarly held in a vessel that is aerated by means of air blowers. However, the vessel is loosely packed with biofilm support materials such as moulded plastic rings. As the wastewater is aerated, microbes in the water grow and become attached to the packing. As more oxygen is supplied, the biofilm grows, converting soluble BOD into biomass. Although in this case the biofilm is immobilised, settling is still a requirement after the biological treatment. However, this process cannot be combined with existing settling since the aeration methods used are turbulent and these would therefore cause mixing and hinder settling.

Neither of these processes can be used to upgrade existing sewage treatment works without the need for additional tanks that have a significant civil cost and space requirement.

One variant of the activated sludge process uses biological treatment combined with membrane filtration; referred to as a membrane bioreactor (MBR). Microfiltration membranes are placed within the activated sludge vessel in which the biological sludge is still aerated by bubbled aeration. The membranes act to filter the sludge. To reduce clogging of the membrane filter by a fouling layer of sludge, the surfaces of the membranes are kept clean by air scouring, a high velocity of superficial flow of liquid, and/or backflushing through the membrane filter.

However, these actions contribute very high running costs to the operation of MBRs, and although the MBR process can sometimes utilise existing tanks, the technology is also expensive due to the large numbers of membranes required to provide sufficient filtration function and the additional pumping and aeration requirements.

It is an object of the present invention to improve existing primary and secondary settlement tanks to include aerobic biological treatment whilst not hindering the original settling process.

According to one aspect of the present invention, there is provided a process for the treatment of water comprising at least the steps of:

(a) providing the water in laminar flow; and
(b) providing bubblefree aeration to the water.

The present invention introduces aerobic treatment into wastewater settlement without any hindrance to the settlement process. The present invention is useable for any settlement step or stage, without limitation, the commonest being primary settlement or final settling.

Laminar flow, also known as streamline flow, occurs when a fluid flows in parallel layers, with no disruption between the layers. In fluid dynamics, laminar flow is a flow regime characterized by high momentum diffusion, low momentum convection, with the pressure and velocity independent from time. It is the opposite of turbulent flow, i.e. laminar flow is smooth while turbulent flow is rough.

The dimensionless Reynolds number can be a parameter in equations that describe whether flow conditions lead to laminar flow or turbulent flow. Reynolds numbers of less than 500 are generally considered to be of a laminar type.

Step (a) of the process of the present invention can comprise quiescent gravity settlement, i.e. lamella settling or using the lamella principle.

Preferably, step (a) comprises passing the water through a plurality of lamella plates.

Lamella settling is well established. Normal gravity settling systems work by controlling the flow of wastewater so that particles are allowed to settle out of solution while the clarifying liquid flows through the process tank. The efficiency of settlement is in theory independent of the height of the settling tank, being dependant on the surface area available for settling. Therefore large shallow tanks should be more effective in allowing particles to be removed. In practice the limitation is that solids will accumulate at the base of the tank, causing disruption to the normal flow and therefore settlement.

In lamella settling systems, this limitation is overcome by placing the shallow tanks at an angle, so that the solids do not accumulate, rather they flow down the base of the sloped shallow tank to a collection point for removal. Settlement tanks of approximately 60 mm in depth are therefore effective in settling solids. Tanks containing water cannot be sloped, so in practice this type of settlement is achieved by stacking layers of parallel plates into conventional tanks, the plates being approximately 60 mm apart. These plates can be vertical, but are usually angled at approximately 40-60° such as 50°, to the horizontal, so that solids fall a relatively short distance to the base of the plate where they accumulate and slide off for removal.

With each plate the effective area for settling is the horizontal area covered by the plate, therefore as the plates are stacked, the total area for settling soon exceeds that of a non-lamella system.

In this way the surface area and therefore settling efficiency can be increased up to 8-fold by including lamella plate packs in the settling basin.

Lamella settling also assists in providing tolerance to hydraulic surges. It can cope with higher rates of flow that occur during surges, whilst still providing settling. With the inclusion of an associated biofilm, the biomass in the film will not be flushed during surges in flow, as is the case in existing activated sludge systems.

In one embodiment of the present invention, step (a) comprises passing the water through a lamella clarifier.

A lamella clarifier, also known as an inclined plate settler, is primarily used in the water and wastewater treatment industries to separate solids from liquids in effluent streams. The clarifier is conventionally the third step in a general four step process for water and wastewater treatment being: the collection and homogenisation of effluent, biological treatment of BODs, etc., clarification, and finally dewatering (of sludge).

Bubblefree aeration can be provided by placing a thin film of polymeric material between an oxygen containing gas phase and a liquid phase. Oxygen is delivered directly into the liquid phase after transport across the membrane.

Preferably, step (b) of the process of the present invention comprises providing bubblefree aeration through one or more gas permeable membranes.

Two types of membrane are generally used, these being gas permeable non-porous membranes and hydrophobic polymeric microporous membranes. The use of ceramic membranes is also possible.

With the gas permeable membranes the gas is dissolved into the membrane and transported across it by means of a concentration gradient that exists from the lumen (gas) side of the membrane, where gas pressures and therefore concentrations are relatively high (1 to 5 bar), to the shell or liquid side, where the oxygen is carried away in solution or is consumed.

Microporous membranes have small pores (commonly 0.1-10 µm) allow oxygen to diffuse from the lumen side to the liquid phase. Both membrane types can be used in various operating modes to provide bubblefree aeration or oxygenation, provided by any oxygen-providing gas, such as oxygen gas itself, air, and other known oxygen providers such as nitrates.

The present invention utilises the retention time of final stage settlement allowing aerobic treatment to take place within the same settlement environment, such as a settler. The retention time can be similar to these used conventionally. Long hydraulic times can be in excess of 2 hours.

The present invention is preferably achieved by combining lamella settling and aerobic biological treatment in one unit or tank.

The process of the present invention may further comprise the step of:
(c) providing a biofilm adjoining the bubblefree aeration.

The aerobic biological treatment is preferably facilitated by placing a bubblefree aeration assembly on the underside of lamella plates with or without a closely placed plastic/metal/carbon grid to provide an enhanced surface area for biofilm growth. The lamella plates increase settlement efficiency; the bubblefree aerator supplies non-turbulent oxygen to the biofilm, supporting a large biomass density for effective wastewater treatment. With the present system, settlement is improved, BOD is reduced and nitrification/de-nitrification can also be achieved. Critically this invention allows these processes to take place in the same vessel as final settlement.

New treatment systems can therefore be built that combine several processes in the same vessel tank, unit, etc thereby requiring little or no extra space. Overall, capital, space and civil costs are greatly reduced when compared to existing solutions to the problem.

In another embodiment of the present invention, the water in laminar flow comprises a clarified water layer, and step (b) comprises providing bubblefree aeration to the clarified water layer.

The water for the present invention can be provided by and/or from aerobic biological treatment source.

According to a second aspect of the present invention, there is provided a water treatment unit comprising:
one or more water laminar flow pathways; and
one or more bubblefree aerators.

Preferably, the unit includes a plurality of lamella plates to provide at least one of the water laminar flow pathways.

One or more of the bubblefree aerators may comprise one or more of the lamella plates.

Alternatively, one or more of the bubblefree aerators may be conjoined with one or more of the lamella plates, using any suitable type of support or support layer or device or apparatus.

According to another embodiment of the present invention, the unit comprises a plurality of bubblefree aerators supported underneath a plurality of lamella plates.

In the unit, the or each bubblefree aerator is preferably a gas permeable membrane as hereinbefore defined, more preferably a microporous membrane.

Preferably, the unit as hereindefined is a wastewater treatment settlement tank, more preferably a lamella clarifier.

The unit can include one or more biofilm supports adjoining the one or more bubblefree aerators.

According to a third aspect of the present invention, there is provided a method of treating water comprising at least an aerobic biological treatment step, and further comprising a process as hereindefined.

According to a fourth aspect of the present invention, there is provided apparatus for treating water comprising at least an aerobic biological treatment unit and a unit as hereindefined.

The present invention encompasses all combinations of various embodiments or aspects of the invention described herein. It is understood that any and all embodiments of the present invention may be taken in conjunction with any other embodiment to described additional embodiments of the present invention. Furthermore, any elements of an embodiment may be combined with any and all other elements of any of the embodiments to describe additional embodiments.

This invention provides at least the following advantages;

Primary and secondary settlement tanks can be used by the inclusion of this process, thereby adding to the functionality of these tanks by introducing secondary and tertiary aerobic treatment into the settlement process without hindering settlement.

Processes are combined in one vessel therefore the number and cost of such vessels is reduced.

The space required for these systems is greatly reduced over existing technologies.

Settlement is normally the last stage of effluent treatment; the present invention allows the upgrade of this final stage to include aerobic wastewater treatment.

Oxygen supply can be carefully controlled thereby controlling the activity and function of the various zones in a biofilm.

The settlement process can now be kept aerobic; problems that arise from holding wastewaters in anoxic settling tanks can be controlled. Such problems include odour production and rising sludge as a result of denitrification.

The degree of air sparging caused by conventional aeration and the stripping of volatile components from the wastewater stream can be reduced.

The aerobic treatment capacity of a treatment works for BOD/COD and ammonia is improved, as well as increased hydraulic capacity.

A further advantage of the present invention is the ability to upgrade existing plants in a cost-effective manner, especially retrofitting. Many wastewater treatment plants exceed stringent discharge standards by only a small margin and improvements in operation are sought by minor process alterations to avoid a capital intensive upgrade.

In particular, a gravity settlement function and an aerobic biological function could be provided as an integral unit, or provided as a separate module or modules to be fitted inside existing water treatment of effluent clarifier tanks. This has the added advantage that the effluent treatment plant efficiency or performance would be improved without the cost and space requirement of conventional aerobic systems.

Experimental

The present invention allows aerobic biological treatment to be carried out in final effluent clarifiers by utilising bubble-free aeration, in combination with a biofilm support and lamella settling. The bubblefree aeration allows a biofilm to be grown and sustained in the settler without introducing turbulence that would otherwise disturb and hinder settling. The lamella plate pack not only provides a support structure for the aeration, it also provides increased settling efficiency and hydraulic capacity that is used to settle any sloughed off biomass that may be present as a result of the aerobic treatment delivered to the system.

The plate pack could be constructed from corrosive resistant materials such as stainless steel for the main supports and plastic sheet for the plates themselves. The bubblefree aeration membranes can be made from either oxygen permeable polymeric dense membranes such as silicone rubber tubing or microporous membranes constructed from materials such as polypropylene or polysulphone.

The table below shows the levels of oxygenation achieved by the present invention using three types of bubblefree aerator. The levels of aeration are based on experimentally obtained oxygen fluxes for the membrane materials selected and specific surface areas that have been calculated as being obtainable with each membrane type.

TABLE 1

(Calculation of the specific oxygenation capacity and aerobic BOD removal rates for flat sheet and tubular polymeric and microporous membranes).

| Membrane Type | Polymeric Flat Sheet | Dense Polymeric Tubing | Microporous Polymeric Tubing |
| --- | --- | --- | --- |
| Oxygen flux ($gO_2/m^2h$) | 0.60 | 2.41 | 0.78 |
| Membrane Specific Surface Area ($m^2/m^3$) | 13.8 | 22.5 | 22.5 |
| Oxygenation Capacity ($gO_2/m^3 \cdot h$) | 8.28 | 54.23 | 17.55 |
| Operating Pressure (bar) | 1.0 | 2.0 | 1.0 |
| BOD Removed (kg BOD/$m^3 \cdot$ day) | 0.099 | 0.615 | 0.211 |

With membrane specific surface areas of up to 22.5 $m^2$ per $m^3$ of settling tank, removal rates for BOD of up to 0.615 kg/$m^3$·day are achievable.

These BOD removal rates were tested using a small-scale test rig. The rig consisted of a 4.4 liter tank fitted with a single lamella plate that had been fitted with a bubblefree aerator and a biofilm support. This rig was fed with an artificial wastewater at a hydraulic retention time of 12 hours and a BOD loading of 0.212 kg BOD/$m^3$·day. After allowing a biofilm to develop for several weeks, the BOD removal capacity of the system was measured. Typical results are shown in table 2 below.

TABLE 2

(Results of small-scale tests using polymeric membranes in a test rig with one lamella plate with a specific surface area of 5.52 $m^2/m^3$. The results are compared to the theoretical calculation of BOD removal as detailed in table 1, these figures being adjusted to the same membrane specific area (5.52 $m^2/m^3$) as used in the test rig).

| | Theoretical | Tested |
| --- | --- | --- |
| Membrane Specific Surface Area ($m^2/m^3$) | | 5.52 |
| Expected Oxygenation Capacity ($gO_2/m^3 \cdot h$) | 13.3 | Not Measured |
| BOD Removed (kg BOD/$m^3 \cdot$ day) | 0.160 | 0.102 |
| BOD Removed Assuming Specific Surface Area of 22.5 $m^3/m^3$ | 0.434 | 0.417 |

The tests show that BOD removal similar to expected values can be obtained. Preliminary designs show that membrane specific surface areas in excess of 20 $m^2/m^3$ can be obtained (as detailed in Table 1 above).

Extrapolation of the results for BOD removal obtained in the experimental tests shown in Table 2 indicate that BOD removals of approximately 0.417 kg BOD/$m^3$·day are possible by the present invention. Although this is similar to BOD removal capacities that could be expected with conventional aerobic treatment systems, the invention achieves this removal concurrently with settlement.

The ability of the present invention to aid total nitrogen removal alongside organic carbon removal was also tested. Using an artificial wastewater with a single organic carbon and single nitrogen source, tests were carried out using the same setup as used to ascertain BOD removal above. Results are shown in Table 3 below.

TABLE 3

Results of small-scale tests using polymeric membranes in a test rig with one lamella plate with a membrane specific surface area of 5.52 $m^2/m^3$ for simultaneous organic carbon and total nitrogen removal. Removal rates with a greater specific surface area will be higher.

|  | Influent wastewater (mg/l) | Effluent quality (mg/l) | Percentage removal |
|---|---|---|---|
| Chemical oxygen demand | 65 | 27 | 59.0 |
| Ammonia ($NH_4$—N) | 12 | 6.43 | 44.7 |
| Total nitrogen | 12 | 7.8 | 33.1 |

In allowing aerobic treatment through bubblefree aeration laminar flow to be combined with gravity settlement this invention provides a number of further embodiments, such as:

(i) A unit wherein settlement is combined with aerobic biological wastewater treatment. This product has several advantages in that it allows the residence time of a settler to be used also for aerobic biological wastewater treatment. This is particularly useful where a settler is used for final effluent treatment but where the quality of the wastewater is not adequate for final discharge. Under these circumstances the existing settler can be converted to act as a unit so that the BOD and/or nutrient levels can also be reduced. No known product or apparatus exists that allows the function of a settling tank to be expanded to include aerobic biological treatment while still maintaining its settling function. This technology could be provided as a retrofit to existing wastewater treatment systems or it could be provided as a new package treatment that allows BOD removal and settlement in one process tank.

(ii) Nutrient removal systems where nitrification and denitrification can be performed as a polishing step during final effluent settlement. This system would allow a dual function biofilm to be used wherein the layer of the biofilm closest to the bubblefree aerator would be aerobic and would carryout nitrification. The layer furthest away from the aerator would be anoxic and would function as a denitrification system. Controlling the air/oxygen flow rate and pressure through the bubblefree aerator would control the relative depths and activities of the layers. Such a system would be novel by the inclusion of such a nutrient removal system into final effluent or primary settlement.

(iii) Multiple processes can be combined into one process vessel, for example primary settling, chemical treatment, secondary aerobic biological treatment, tertiary BOD and nutrient polishing and final. Management of the oxygen delivery would control the activity of the biological function, allowing different zones to treat different parameters in the wastewater. In this way improved nutrient removal could be achieved.

(iv) The bubblefree aeration function could also be used with gravity settlement systems to prevent the vessels from becoming anoxic, which can be problematic and lead to the phenomenon of 'rising sludge' in which denitrification occurs under anoxic conditions, leading to formation of bubbles of nitrogen gas which cause sludge particles to float and result in carry-over of solids into the final discharge.

An advantage of this system is summarized in Table 4 below, which describes results for a conventional settler, a conventional lamella settler, and a 'biosettler' unit as an example of the present invention, combining gravity settlement and a biological function. It should be noted that the advantage afforded by a lamella settler is not increased solids removal, but rather the possibility to maintain the desired level of solids removal at much shorter hydraulic residence time. This allows a given settler to treat an increased flow, or a settler of reduced size to be installed.

TABLE 4

A comparison of results for conventional and lamella settlements compared the biosettler unit combining gravity settlement with a biological function.

|  | Effluent before settlement | Conventional Settler | Lamella Settler | Biosettler (% removal) |
|---|---|---|---|---|
| Dairy Effluent (biological treatment) |  |  |  |  |
| Soluble BOD (mg/l) | 34.0 | 34.0 | 34.0 | 10.2 (70%) |
| Ammonia (mg/l) | 9.7 | 9.7 | 9.7 | 3.9 (60%) |
| Suspended solids (mg/l) | 3000 | 27 | 25 | 25 |
| Small municipal sewage plant (biological) |  |  |  |  |
| Soluble BOD (mg/l) | 31 | 31 | 31 | 9.3 (70%) |
| Ammonia (mg/l) | 7.7 | 7.7 | 7.7 | 3.1 (60%) |
| Textile printing (chemical treatment) |  |  |  |  |
| Soluble COD (mg/l) | 207 | 207 | 207 | 103 (50%) |
| Soluble BOD (mg/l) | 50 | 50 | 50 | 15 (70%) |

Table 4 confirms that the biological function of the biosettler allows additional BOD, COD and ammonia removal to occur during settlement, which is not achieved in the conventional and lamella settlers.

The 'biosettling' function of the present invention can have a membrane specific surface area achievable in a full scale plant (20 $m^2/m^3$), which will achieve higher percentage removal rates than those shown in Table 3.

The examples herewith are for typical treatment plants without defined limits for discharge to surface waters.

Embodiments of this invention could be provided in at least two forms.

Firstly as a package plant that could be bought pre-built as complete wastewater treatment systems for new build, upgrade or replacement applications.

Secondly as a retrofit upgrade, whereby modules could be fitted to existing tanks to add additional aerobic treatment efficiency using existing vessels, without hindering existing processes such as settlement.

Embodiments of the present invention will now be described by way of example only and with reference to the accompanying drawings in which.

Settlers (also called clarifiers or settlement basins) are an integral part of almost all biological treatment plants, and function to remove suspended solids by sedimentation. Following aerobic biological treatment, the bacterial biomass, which exists as suspended solids, must be separated from the clean wastewater before discharge. Wastewater flows into a settler which provides a quiescent period, usually of at least two hours, in which the wastewater moves slowly through the basin or tank allowing the bacterial sludge to settle and separate from the treated wastewater. The treated wastewater can then be discharged with a very low level of suspended material.

However, there is no oxygen supply during this period as rising air bubbles would disrupt the settlement process. Thus, aerobic pollution removal processes cease in conventional settlers. Settlers occupy a large area of a treatment plant, but do not therefore contribute to the biological treatment.

As mentioned hereinbefore, settlers incorporating standard lamella plates can treat between 2-8 times the hydraulic flow of conventional settlers. Such settlers can be used for both municipal and industrial wastewater treatments.

Figure 1:
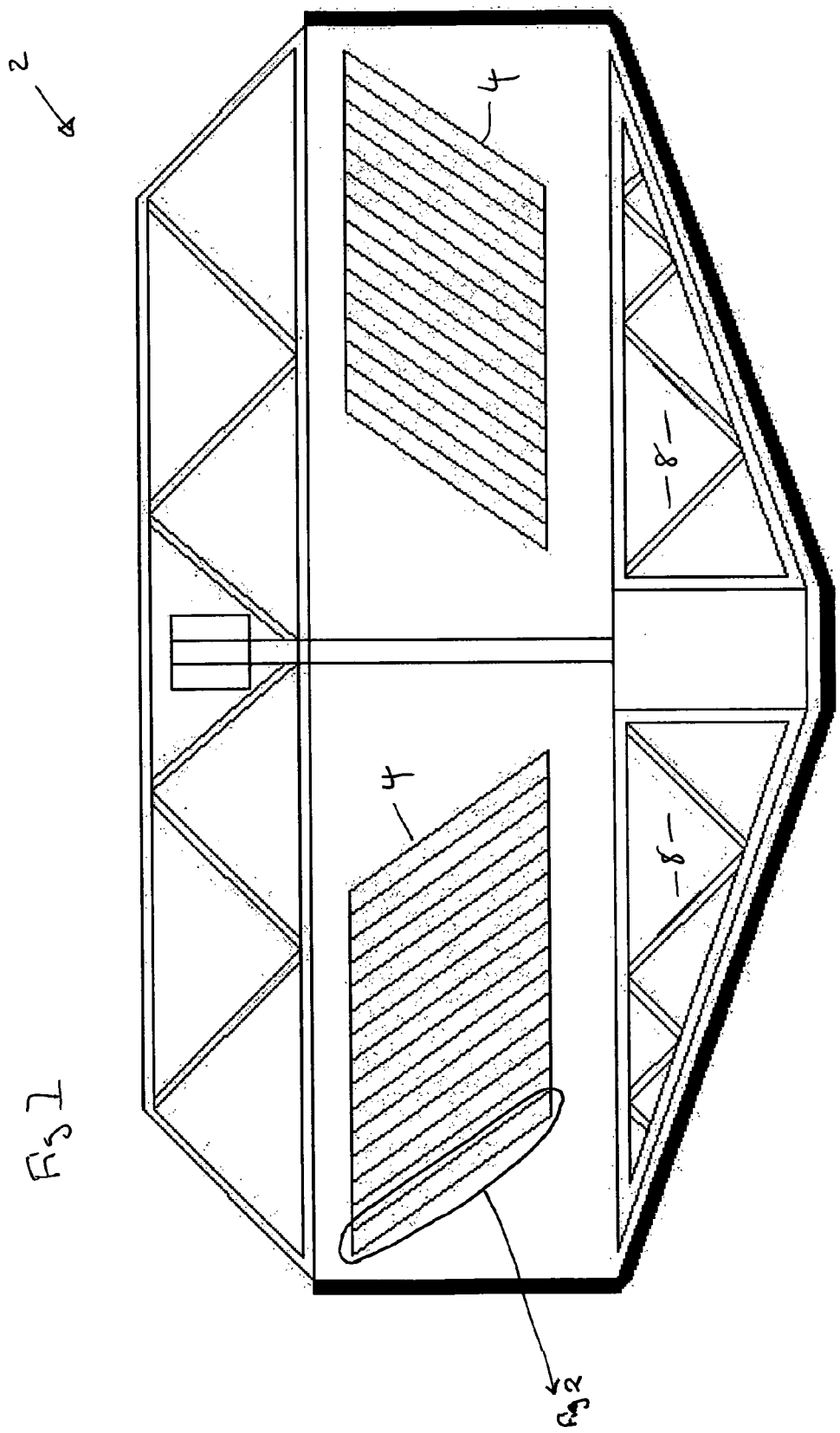
FIG. 1 is a schematic cross-sectional view of a lamella clarifier according to one embodiment of the present invention.

FIG. 1 shows a lamellar clarifier 2 in general schematic form, wherein water from an aerobic biological treatment source (not shown) having a bacterial biomass as suspended solids, enters the lamella clarifier 2 generally centrally and downwardly, so as to subsequently pass upwardly through the sets of lamella plates 4. The lamella plates 4 use the lamella principle, wherein several parallel inclined plates maximise the available settling area for any available floor area. In known examples, the lamella plates are provided in regular parallelepiped sets, either aligned in rectangular clarifiers or clockwise in a circular clarifier.

The lamella plates 4 provide laminar flow for the water passing between the plates 4. The plates 4 cause the suspended or flocculate material in the water to precipitate as a function of fluid drag versus gravity. As the biomass particles hit the plates 4, they slide down the plates 4 to discharge into the thickening zone 8 of the clarifier 2.

Figure 2:
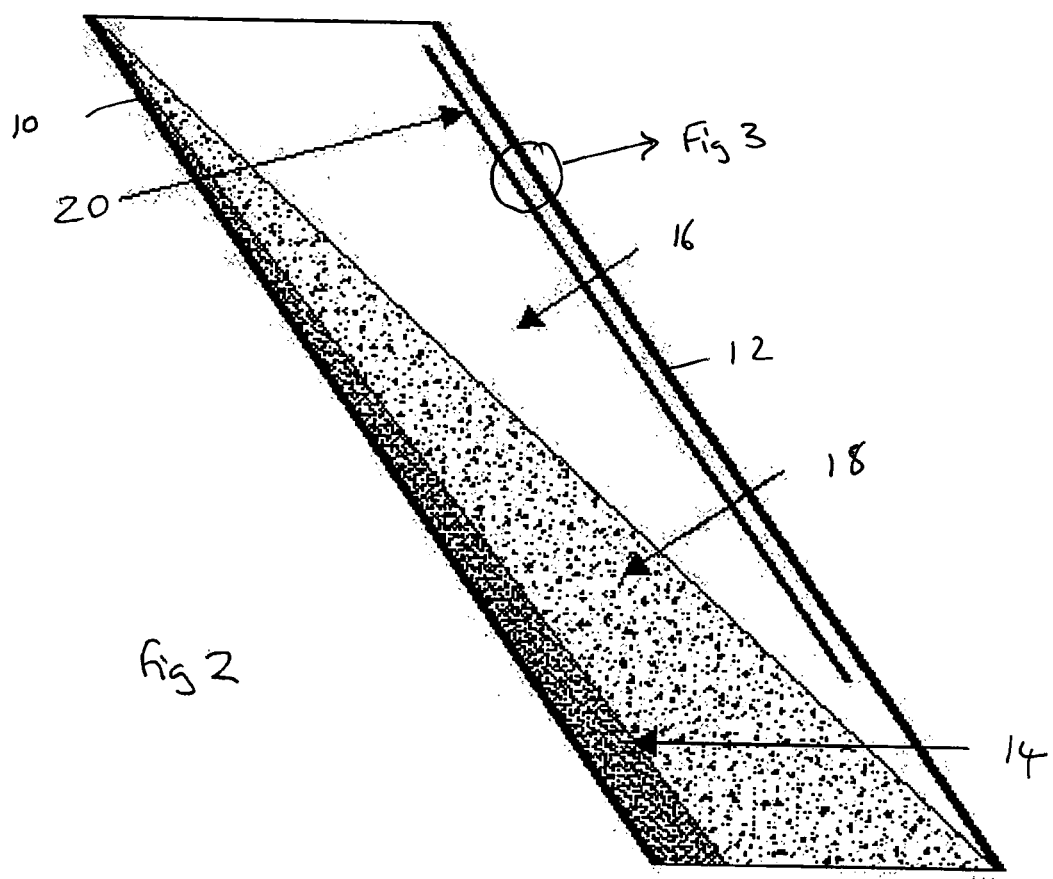
FIG. 2 is an enlargement of a section of FIG. 1 showing two lamella plates and a bubblefree aerator.

FIG. 2 is an expanded view of part of two parallel lamella plates 10, 12 of FIG. 1. On the left hand lamella plate 10, a sludge layer 14 is being formed as the biomass particles separate from the water passing upwardly between the lamella plates 10, 12. Water from which the biomass particles have wholly or substantially passed out of, can be defined as a clarified layer 16. Between the clarified layer 16 and the sludge layer 12, there is generally a mixed layer 18 wherein the biomass particles are still part of the water, but becoming separated therefrom. The clarified layer 16 continues to pass upwardly through the lamella plates 10, 12 and then out of the lamella clarifier 2, usually over one or more upper walls or lips thereof, for discharge.

The layer dimensions shown in FIG. 2 are exaggerated for the purpose of clarity and understanding.

Without an oxygen supply, there can be no aerobic biological treatment of the water in the lamella clarifier 2. As described hereinabove, the addition of bubbled aeration would create turbulence in the water, and therefore be contrary to the clarifying or settling function intended at this stage of the water treatment.

The present invention provides water in lamella flow, shown in FIGS. 1 and 2 by the water lamella flow pathways between the lamella plates 4, 10, 12, and bubblefree aeration by the provision of one or more bubblefree aerators such as gas permeable membranes 20 as shown in FIG. 2. FIG. 2 shows the location of a gas permeable membrane 20 supported beneath the lamella plate 12 so as to be in the clarified layer 16 of the water.

Figure 3:
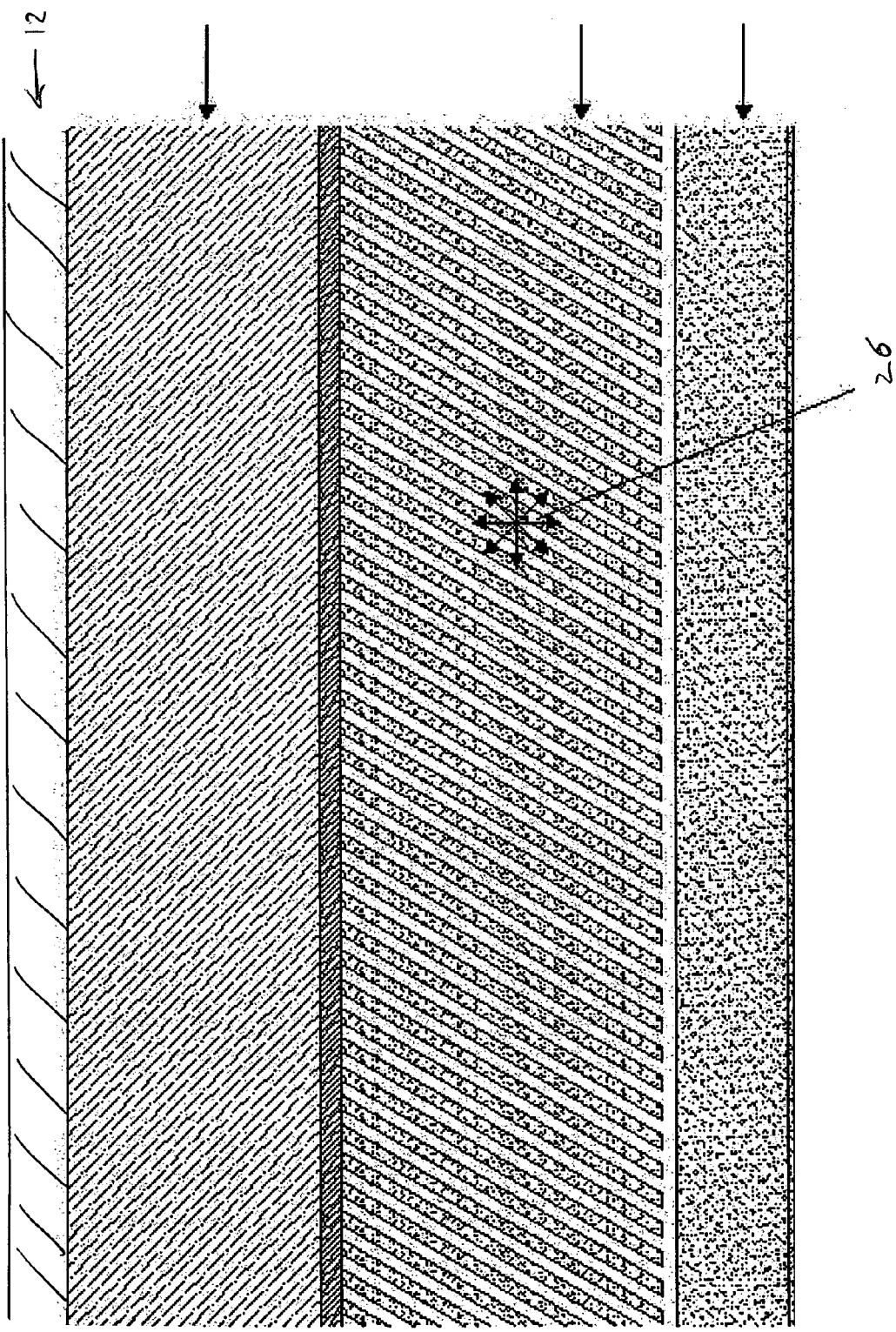
FIG. 3 is an enlargement of a section of FIG. 2.

FIG. 3 shows an expanded view of a section of FIG. 2, comprising the lamella plate 12 adjoined to a membrane support 22 able to support the gas permeable membrane 20 in place next to the lamella plate 12.

Gas permeable membranes, generally having a submicron pore size, or otherwise dense gas membranes, are known in the art, and are able to allow the passage of an oxygen-containing gas such as oxygen, air or any other such gas, therethrough, without the formation of gas bubbles on the outside of the membrane surface, whose formation would be contrary to the quiescent settlement function.

FIG. 3 shows in figurative form oxygen flow 26 from a membrane surface. Supply of the oxygen containing gas into the membrane 20 can be by the use of conventional gas piping, and using a gas pressure able to provide the correct passage of the oxygen containing gas through the membrane without the formation of bubbles thereby.

FIG. 3 also shows a biofilm support layer 24 adjoining the membrane 20. Generally, the biofilm support layer 24 is able to allow the formation of a biofilm thereon and/or therearound, whose bacteria can feed from the oxygen supplied by the oxygen containing gas, and therefore affect biological treatment to continue during settlement.

By the location of the gas permeable membrane 20 in the clarified layer 16, the biofilm formed in/on the biofilm support layer 24 can particularly act on the remaining BOD materials, etc that remain in the clarified layer 16 prior to its passage beyond the lamella plates 4.

Figure 4:
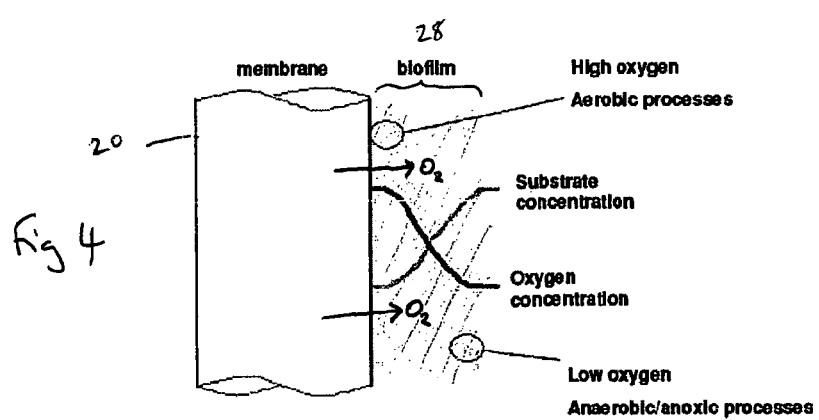
FIG. 4 is a view of the action of one tube of a gas permeable membrane and adjoining biofilm.

FIG. 4 shows an explanation of the movement of oxygen from one tube of the gas permeable membrane 20 into a biofilm 28, and the oxygen concentration and substrate concentration as the oxygen passes through the biofilm 28 and is used by the bacteria therein.

In one alternative embodiment, the lamella plates 4 are wholly or substantially vertical.

In another alternative embodiment, the lamella plates are the bubblefree aerators.

Various modifications and variations to the described embodiments of the invention will be apparent to those skilled in the art without departing from the scope of the invention as defined herein. Although the invention has been described in connection with specific preferred embodiments it should be understood that the invention as defined herein should not be unduly limited to such specific embodiments.

The invention claimed is:

1. A process for the treatment of waste water comprising:
   passing waste water through a plurality of lamella plates to provide the waste water in laminar flow and quiescent gravity settlement; and
   providing bubble-free aeration to the waste water via one or more bubble-free aerators disposed between adjacent lamella plates of the plurality of lamella plates.

2. The process as claimed in claim 1 wherein the passing the waste water through the plurality of lamella plates comprises passing the waste water through a lamella clarifier.

3. The process as claimed in claim 1 wherein the providing bubble-free aeration comprises providing bubble-free aeration through one or more gas permeable membranes.

4. The process as claimed in claim 1 comprising providing a biofilm adjoining the bubble-free aeration.

5. The process as claimed in claim 1 wherein:
   the waste water in laminar flow comprises a clarified water layer; and
   the providing bubble-free aeration comprises providing bubble-free aeration to the clarified water layer.

6. The process as claimed in claim 1 wherein the waste water is provided from an aerobic biological treatment source.

7. A waste water treatment unit comprising:
    a plurality of lamella plates to provide a plurality of waste water laminar flow pathways;
    a plurality of bubble-free aerators, at least one bubble free aerator of the plurality of bubble-free aerators disposed between adjacent lamella plates of the plurality of lamella plates; and
    the lamella plates having a support structure for the plurality of bubble-free aerators.

8. The unit as claimed in claim 7 wherein the plurality of bubble-free aerators are supported beneath the plurality of lamella plates.

9. The unit as claimed in claim 7 wherein each bubble-free aerator of the plurality of bubble-free aerators comprises a gas permeable membrane.

10. The unit as claimed in claim 9 wherein the gas permeable membrane is a microporous membrane.

11. The unit as claimed in claim 7, wherein the unit comprises a wastewater treatment settlement tank.

12. The unit as claimed in claim 11 wherein the unit comprises a lamella clarifier.

13. The unit as claimed in claim 7 including one or more biofilm supports adjoining the plurality bubble-free aerators.

14. The process as claimed in claim 1, comprising at least an aerobic biological treatment.

15. The unit as claimed in claim 7, comprising an aerobic biological treatment unit.

16. The unit as claimed in claim 7, wherein:
    each waste water laminar flow pathway of the plurality of waste water laminar flow pathways comprises a clarified water layer of a plurality of clarified water layers; and
    each bubble-free aerator of the plurality of bubble-free aerators is located in a clarified water layer of the plurality of clarified water layers.

\* \* \* \* \*